United States Patent
Hanauska et al.

(10) Patent No.: US 12,523,085 B2
(45) Date of Patent: Jan. 13, 2026

(54) METHOD FOR CARRYING OUT A CLOSING OPERATION, CLOSING DEVICE, SERVER APPARATUS AND COMMUNICATION TERMINAL FOR CARRYING OUT A METHOD OF THIS TYPE

(71) Applicant: Conti Temic microelectronic GmbH, Nuremberg (DE)

(72) Inventors: Andreas Hanauska, Preith (DE); Christian Gruber, Wolkertshofen (DE); Norbert Seuling, Ingolstadt (DE); Mohammad Shaikh, Ingolstadt (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 562 days.

(21) Appl. No.: 17/632,012

(22) PCT Filed: Jul. 29, 2020

(86) PCT No.: PCT/EP2020/071355
§ 371 (c)(1),
(2) Date: Feb. 1, 2022

(87) PCT Pub. No.: WO2021/018943
PCT Pub. Date: Feb. 4, 2021

(65) Prior Publication Data
US 2022/0268081 A1    Aug. 25, 2022

(30) Foreign Application Priority Data
Aug. 1, 2019   (DE) ................. 10 2019 211 611.6

(51) Int. Cl.
*E05F 15/71*   (2015.01)
*E05F 15/611*  (2015.01)
*G05B 13/02*   (2006.01)

(52) U.S. Cl.
CPC ............ *E05F 15/71* (2015.01); *E05F 15/611* (2015.01); *G05B 13/0265* (2013.01);
(Continued)

(58) Field of Classification Search
CPC ......... E05F 15/71; E05F 15/611; E05F 15/41; G05B 13/0265; E05Y 2201/434;
(Continued)

(56) References Cited

U.S. PATENT DOCUMENTS 5,668,451 A    9/1997  Driendl et al.
6,297,609 B1  10/2001  Takahashi et al.
(Continued)

FOREIGN PATENT DOCUMENTS

CN    107191087 B    9/2017
DE      3303590 A1    8/1984
(Continued)

OTHER PUBLICATIONS

Office Action dated Jun. 9, 2020 from corresponding German patent application No. DE 10 2019 211 611.6.
(Continued)

*Primary Examiner* — Tameem D Siddiquee

(57) ABSTRACT

A method for carrying out a closing operation of a closing part device of a vehicle driven by an electric motor drive unit is disclosed. The method has the following steps: ascertaining friction force data that represent a current stiffness of the closing device using a machine learning method that has been trained with reference friction force data from past closing operations as input data, wherein the input data are transmitted to a server apparatus that is configured to ascertain the friction force data using the machine learning method, ascertaining target drive power data, taking the friction force data into consideration, for the drive unit, and operating the drive unit based on the ascertained target drive (Continued)

Figure 1:
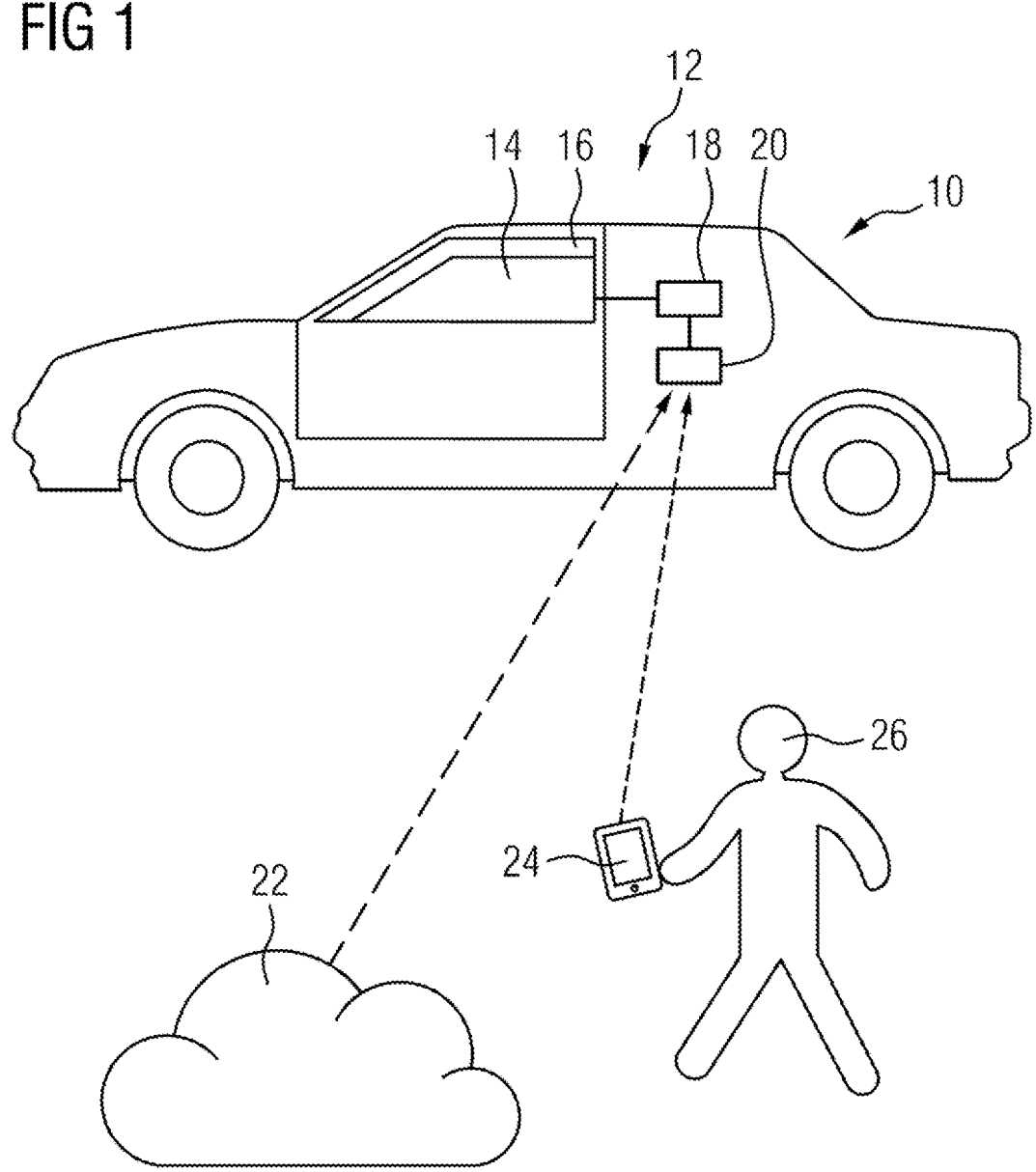

power data to carry out the closing operation in at least one subsequent closing operation.

16 Claims, 4 Drawing Sheets

(52) U.S. Cl.
    CPC ..... *E05Y 2201/434* (2013.01); *E05Y 2400/31* (2013.01); *E05Y 2400/36* (2013.01); *E05Y 2400/40* (2013.01); *E05Y 2400/8515* (2024.05); *E05Y 2900/531* (2013.01)

(58) Field of Classification Search
    CPC ............. E05Y 2400/31; E05Y 2400/36; E05Y 2400/40; E05Y 2400/85; E05Y 2900/531; E05Y 2400/315; E05Y 2400/80; E05Y 2800/00
    See application file for complete search history.

(56) References Cited

U.S. PATENT DOCUMENTS

| | | | |
|---|---|---|---|
| 6,636,814 | B1 | 10/2003 | McCullers et al. |
| 7,859,204 | B2 | 12/2010 | Sakai et al. |
| 8,068,958 | B2 | 11/2011 | Schlesiger et al. |
| 9,731,668 | B2 | 8/2017 | Gusikhin et al. |
| 10,030,432 | B1 * | 7/2018 | Heirtzler, Jr. ........... E05F 15/73 |
| 2003/0122651 | A1 | 7/2003 | Doi et al. |
| 2009/0007493 | A1 | 1/2009 | Hohn et al. |
| 2010/0256876 | A1 * | 10/2010 | Morawek ............. H02H 7/0851 |
| | | | 701/49 |
| 2017/0090434 | A1 | 3/2017 | Katsuki |
| 2018/0222462 | A1 | 8/2018 | Varnhagen |
| 2020/0075004 | A1 * | 3/2020 | Han ......................... G06F 3/167 |
| 2022/0243521 | A1 * | 8/2022 | Herman ................. E05F 15/622 |

FOREIGN PATENT DOCUMENTS

| | | |
|---|---|---|
| DE | 3303590 C2 | 6/1989 |
| DE | 9217563 U1 | 4/1993 |
| DE | 19745597 A1 | 4/1999 |
| DE | 102006023330 A1 | 11/2007 |
| DE | 102007056228 A1 | 6/2009 |
| DE | 102009054107 A1 | 5/2011 |
| DE | 102013220904 A1 | 4/2015 |
| EP | 0714052 B1 | 5/1996 |
| EP | 0976675 A1 * | 2/2000 |
| WO | 2015055426 A1 | 4/2015 |

OTHER PUBLICATIONS

International Search Report and Written Opinion dated Nov. 5, 2020 from corresponding International patent application No. PCT/EP2020/071355.

"Servers", (Original and machine translation), Wikipedia, Accessed on Dec. 13, 2021: https://de.wikipedia.org.

Office Action dated Jun. 27, 2025 from corresponding German patent application No. 10 2019 211 611.6.

* cited by examiner

METHOD FOR CARRYING OUT A CLOSING OPERATION, CLOSING DEVICE, SERVER APPARATUS AND COMMUNICATION TERMINAL FOR CARRYING OUT A METHOD OF THIS TYPE

The present invention relates to a method for carrying out a closing operation of a closing part driven by an electric motor drive unit such as, for example, a door, a window, a sunroof or a flap of a closing device of a vehicle. The present invention furthermore relates to a closing device with a control device for carrying out a method of this type, and to a server apparatus and a communication terminal, in particular a mobile communication terminal, for carrying out a method of this type.

Closing devices of vehicles usually comprise a non-movable (static) element, and a movable closing element or closing part such as, for example, a door, a window, a sunroof or a flap whose position is movable with respect to the non-movable element by means of a drive unit, in particular an electric motor drive unit, in order to open and/or to close a corresponding opening of the vehicle. Closing devices of this type are usually employed in vehicle technology for positioning vehicle doors, vehicle windows, windscreens or flaps such as, for example, tailgates of the vehicle.

A typical functionality of closing devices of this type is protection against trapping or injuring objects trapped in the opening region of the closing part. Maximum values of a load torque of a drive unit driving the closing part by means of an electric motor are, for example, defined in the case of trap protection of this type. If these maximum values are exceeded when closing the closing part, a controller will detect that trapping has occurred, and if appropriate effectuate a reversal of the closing part.

It has, however, been found that under some circumstances controllers of this type based on maximum values recognize that trapping has occurred even though trapping has not in fact occurred. So-called false positive reversal or false positive trapping of this type is not wanted by the user of the vehicle, and is often perceived as disturbing, or even as a malfunction of the closing device.

The object of the present invention is therefore that of creating a method for carrying out a closing operation of a closing part driven by an electric motor drive apparatus with which more reliable trap protection can be realized. It is furthermore an object of the present invention to provide a closing device with a control device for carrying out a method of this type, and a server apparatus and a communication terminal for carrying out a method of this type.

These objects are achieved by a method as claimed in patent claim 1, by a closing device as claimed in patent claim 6, by a server apparatus as claimed in patent claim 7, and by a communication terminal as claimed in patent claim 9. Advantageous configurations are specified in the dependent claims.

According to a first aspect of the present invention, a method for carrying out a closing operation of a closing part, driven by an electric motor drive unit, of a closing device of a vehicle is provided.

The closing part can, in particular, be a door, a window or a flap of the vehicle. The method according to the invention comprises the following steps: ascertaining friction force data that represent a current stiffness of the closing device by means of a machine learning method that has been trained with reference friction force data from past closing operations as input data, wherein the input data are transmitted to a server apparatus that is designed to ascertain the friction force data by means of the machine learning method, ascertaining target drive power data, taking the friction force data into consideration, for the drive unit, and operating the drive unit on the basis of the ascertained target drive power data to carry out the closing operation in at least one subsequent closing operation.

The friction force data representing a current stiffness of the closing device are estimated values that estimate the stiffness to be expected at the respective closing position of the closing part. These estimated values are ascertained by the machine learning method with the aid of training data. To be able to estimate the stiffness of the closing device, the machine learning method is trained with the closing operations obtained from test, training and/or validation runs of the vehicle. Actual friction force data are ascertained during these "test closing operations" (for example using closing-position-dependent load torque measurements at the drive unit), and these actual friction force data are then used in the form of reference friction force data as input data for training the machine learning method. On the basis of the training data used, the machine learning method which can, for example, be a neural network or a decision tree (regression tree or boosted regression tree) then supplies estimated values for the stiffness or friction force to be expected in the closing device that opposes the closing part at the respective closing position. The friction force or the stiffness here is the result of a (mechanical) interplay between the respective components of the closing device, as well as being the result of external effects that act on the closing device (ambient temperature, ambient humidity, aging effects, soiling, etc.).

The particular feature is that the input data are transmitted to a server apparatus that is designed to ascertain the friction force data. This means that the actual implementation of the machine learning method takes place on the server apparatus and not, for example, on a control device of the vehicle. This has the advantage that a greater computing capacity can be used. At the same time, a more economical and space-saving control device can be installed in the vehicle.

The friction force data for the start-up phase or transient phase of the closing device ascertained by the machine learning method are particularly important. Actual friction force data can only be obtained with difficulty, if at all, in this phase. Mechanical tensioning or pretensioning of the components of the closing device, cable play compensation of a Bowden cable or cable pull that may be present in the closing device, pretensioning of spring elements of the closing device or, quite generally, starting up or transient settling of the components of the closing device arise at the same time during the transient phase of the closing device. This transient settling, however, results in changes to the friction that can be reliably estimated by means of the machine learning method.

On the basis of the friction force data ascertained by the machine learning method, corresponding target drive power data for the drive unit are then ascertained—for example using a predetermined or preset assignment function—which take into consideration the friction force data or the estimated values for the expected stiffness of the closing device. The consideration is brought about in that the target drive power data are selected (by means of the assignment function) in such a way that the closing part can, at the respective closing position, overcome at least the estimated value of the friction force to be expected (as ascertained by means of the machine learning method). In other words, the target drive power data are selected in such a way that the closing part can overcome the friction force that will presumably oppose it at the respective closing position.

After the target drive power data have been ascertained, the drive unit is finally operated on the basis of the ascertained target drive power data to carry out the closing operation in at least one subsequent closing operation. The closing part is thus operated in such a way that the closing part can at least overcome the friction force (to be expected) opposing the closing part at the respective closing position.

The method according to the invention is in particular based on the idea that changes in the stiffness, and thus changes to the friction in the closing device, can occur every now and then during the service life of a closing device. Changes to the ambient conditions of the closing device can also lead to changes in the friction or the stiffness of the closing device. A lower ambient temperature, for example, has the consequence of greater stiffness. These changes to the stiffness of the closing device have the result that, under certain circumstances, the friction force opposing the closing part at the respective closing position would exceed a maximum value set once by the system, which would then be identified as a trapping event, even though it is not a trapping event.

Since, however, the friction force to be expected at the respective closing position is estimated in advance by means of the method of the invention, and this expected friction force is subsequently taken into consideration in such a way that the drive unit is operated with a target drive power that overcomes the friction force, the changes occurring in the course of the service life of a closing device, as well as the changes to the stiffness acting from outside of the closing device, can be appropriately considered. As a result, the number of incorrectly detected trapping events (false positive events) is reduced, and the reliability and user-friendliness of the closing device is increased.

The use of a machine learning method to ascertain the respective friction forces to be expected also has the advantage that no complex measurements of the currently occurring friction forces need to be carried out at or in the closing device. The respective friction forces currently to be expected can instead be reliably estimated in the form of the friction force data by the machine learning method, so that the respective target drive power then necessary for the drive unit can be ascertained in the form of the target drive power data. The method of the invention has advantages in particular in the transient phase of the closing device, since measurements of the friction forces actually occurring there can only be carried out with difficulty, if at all. However, even during this difficult phase, estimated values for the friction force data to be expected in the closing device can be ascertained reliably on the basis of the large amount of training data by means of the machine learning method. Since, moreover, the machine learning method is implemented on the server apparatus, and not, for instance, on the control device of the vehicle, more complex models can also be used to ascertain the estimated values.

The machine learning method can, for example, be a neural network in which reference friction force data from closing operations carried out previously or in the past, and that have, for example, been collected during test, training and/or validation runs of the vehicle, are used as input data for training the neural network. The machine learning method can, however, also be a decision tree (regression tree or boosted regression tree).

According to one embodiment of the method of the invention, the reference friction force data are ascertained on the basis of closing-position-dependent load torque measurements taken at an electric motor of the drive unit. This embodiment is based on the idea that the load torque present at the electric motor of the drive unit allows conclusions as to friction force data, or conclusions as to the stiffness of the closing device, to be drawn. The load torque at the electric motor is thus usually greater when the stiffness of the closing device is greater. The reference friction force data at the electric motor can be obtained by means of load torque measurements, which are used later as training data for the machine learning method.

According to a further embodiment of the method of the invention, the input data for training the machine learning method also comprise data that represent an ambient temperature of the vehicle, an ambient air humidity of the vehicle, and/or a positioning speed of the closing part. It has thus, for example, been recognized that lower ambient temperatures, lower ambient air humidities and/or lower positioning speeds of the closing part allow an increased stiffness of the closing device to be deduced. In that the input data for training the machine learning method also contain data sets that take different ambient temperatures, ambient air humidities and/or positioning speeds of the closing part into consideration, the friction force data ascertained by the machine learning method can be determined accurately for the respective situation.

According to a further embodiment, in addition to the reference friction force data from test, training and/or validation runs, the friction force data representing a current stiffness are also used as additional input data for training the machine learning method. In other words, the friction force data, obtained from current closing operations or estimated, are used as additional input data for training the machine learning method. The machine learning method thus updates itself, so that, for example, symptoms of the aging of the closing device can also be taken into consideration.

In a particularly preferred embodiment, the friction force data representing a current stiffness are, however, only used for training the machine learning method when a trigger event occurs. The trigger event can be an internal trigger event or an external trigger event.

An internal trigger event is, for example, a self-diagnosis carried out by the control device of the vehicle, wherein a current closing-position-dependent load torque (determined, for example, through a measurement at the electric motor) is compared with the load torque estimated by the machine learning method for the same closing position. If it is then ascertained that the current load torque differs from the load torque estimated by means of the machine learning method by more than a threshold value, then an internal trigger signal can be output in the context of the self-diagnosis, making the need for an update, and thereby the necessity of a renewed training of the machine learning method, necessary. The self-diagnosis or system diagnosis that can finally serve as an internal trigger event for updating the machine learning method is, for example, installed on the control device of the closing device. An external trigger event is, for example, a trigger signal output from a control center or an external monitoring device which indicates the need for an update or for a renewed training of the machine learning method. The control center or the monitoring device can be arranged at an external site, i.e. outside the control device or outside the server apparatus, which again saves installation space. The internal and external trigger events make it possible to carry out an update of the machine learning method deliberately, i.e. only when required. This saves time and computing resources.

The method according to the invention can be designed as a computer program product that comprises at least one computer-readable storage medium with program code instructions stored thereon and executable by a computer that are designed for carrying out the method or embodiments thereof.

According to a second aspect of the present invention, a closing device for a vehicle is provided. The closing device comprises a closing part such as, for example, a window, a door, a sunroof or a flap (or tailgate) of the vehicle that is designed for closing (as well as for opening) a corresponding opening of the vehicle. The closing device of the invention further comprises an electric motor drive unit for driving the closing part, as well as a control device that is designed for carrying out a method according to the first aspect or embodiments thereof. The closing part can be reliably closed with the closing device according to the invention, and the number of false positive trapping events can be reduced.

According to a third aspect of the present invention, a server apparatus is provided that is designed for carrying out a method according to the first aspect or embodiments thereof. In a particularly preferred embodiment, the server apparatus is designed external to the vehicle, i.e. outside the vehicle. This has the advantage that no additional installation space is required in the vehicle for carrying out the method.

Finally, according to a fourth aspect of the present invention, a communication terminal is provided that is designed for carrying out a method according to the first aspect or embodiments thereof. The communication terminal is, according to the invention, designed externally to the vehicle and is mobile. The communication terminal can, for example, be a smartphone or the like. This has the advantage that the method according to the invention can be used on mobile devices such as, for example, smartphones. The method can, for example, be carried out in the form of a computer program product (app) that can be executed on the mobile communication terminal.

Figure 2:
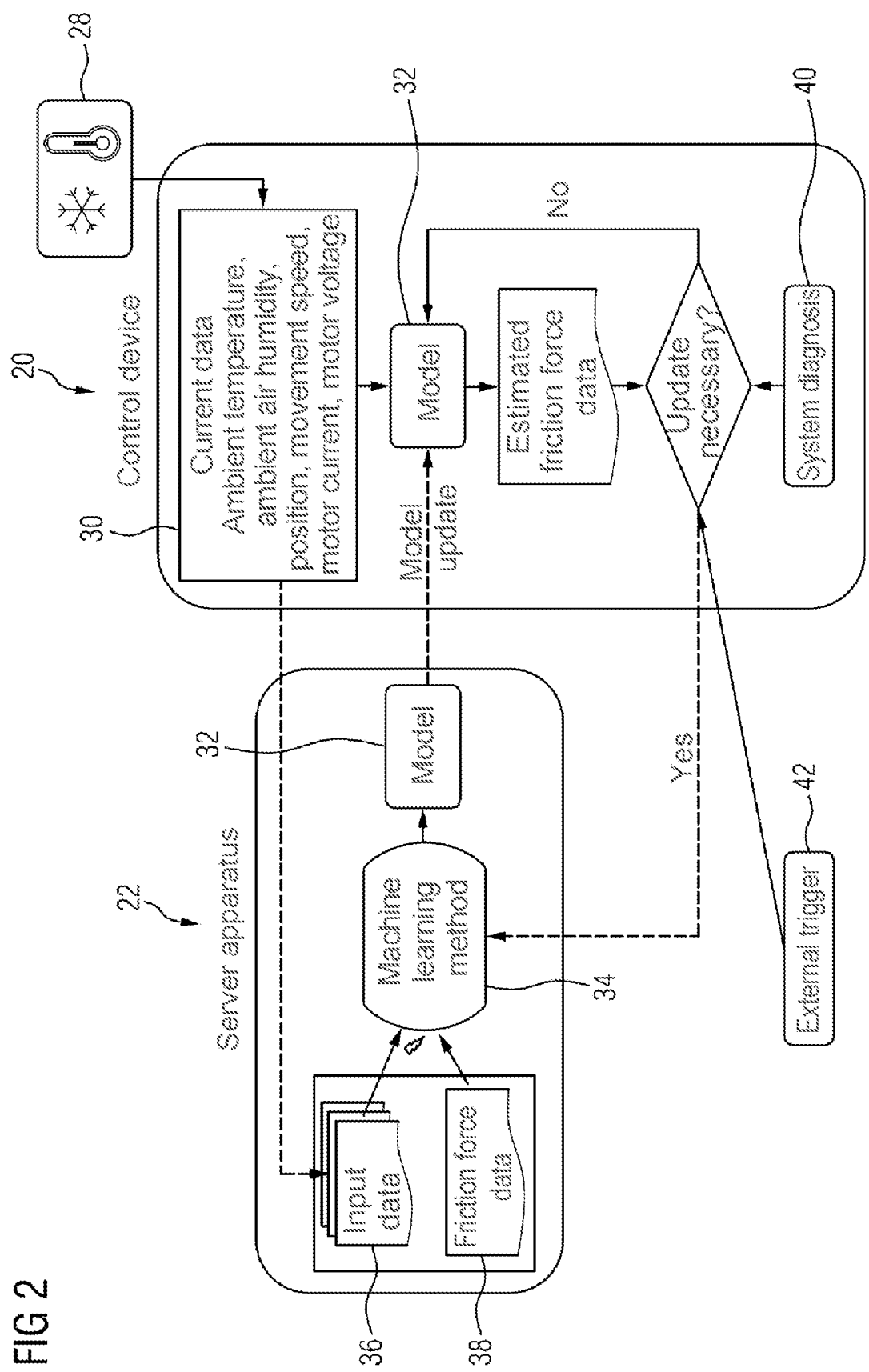
Figure 3:
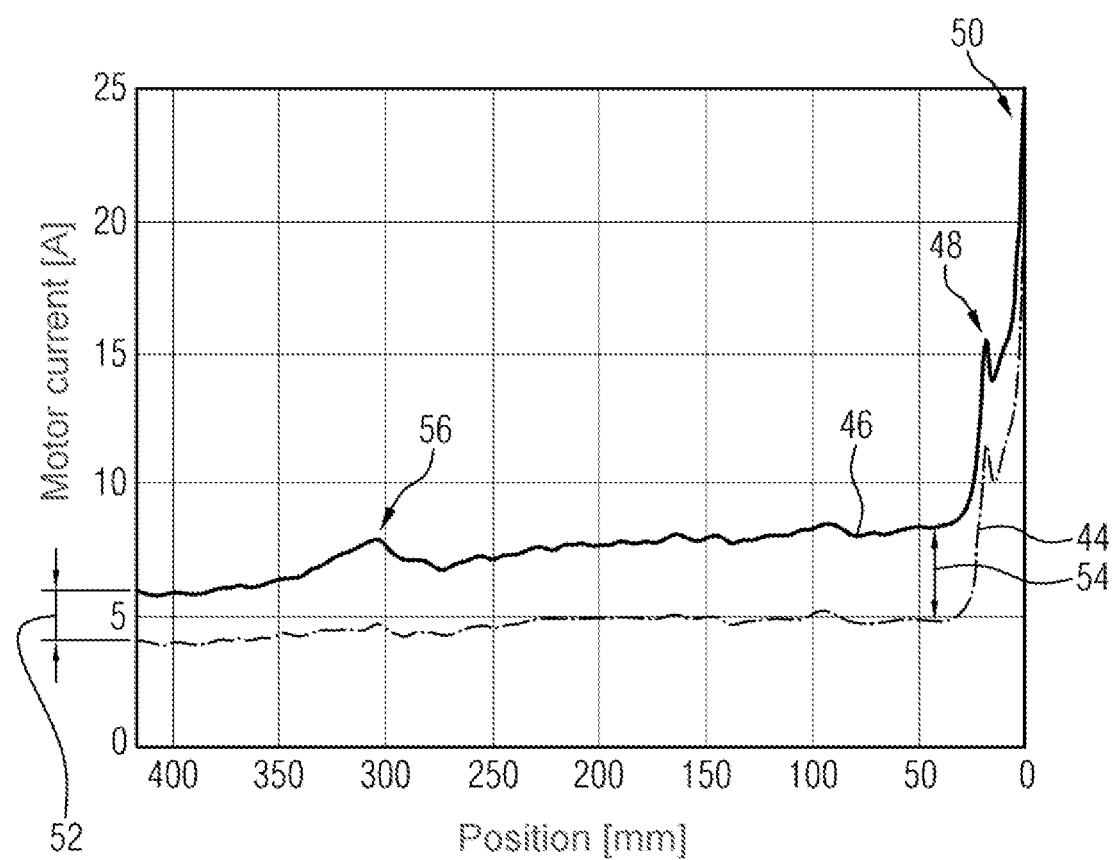
Figure 4:
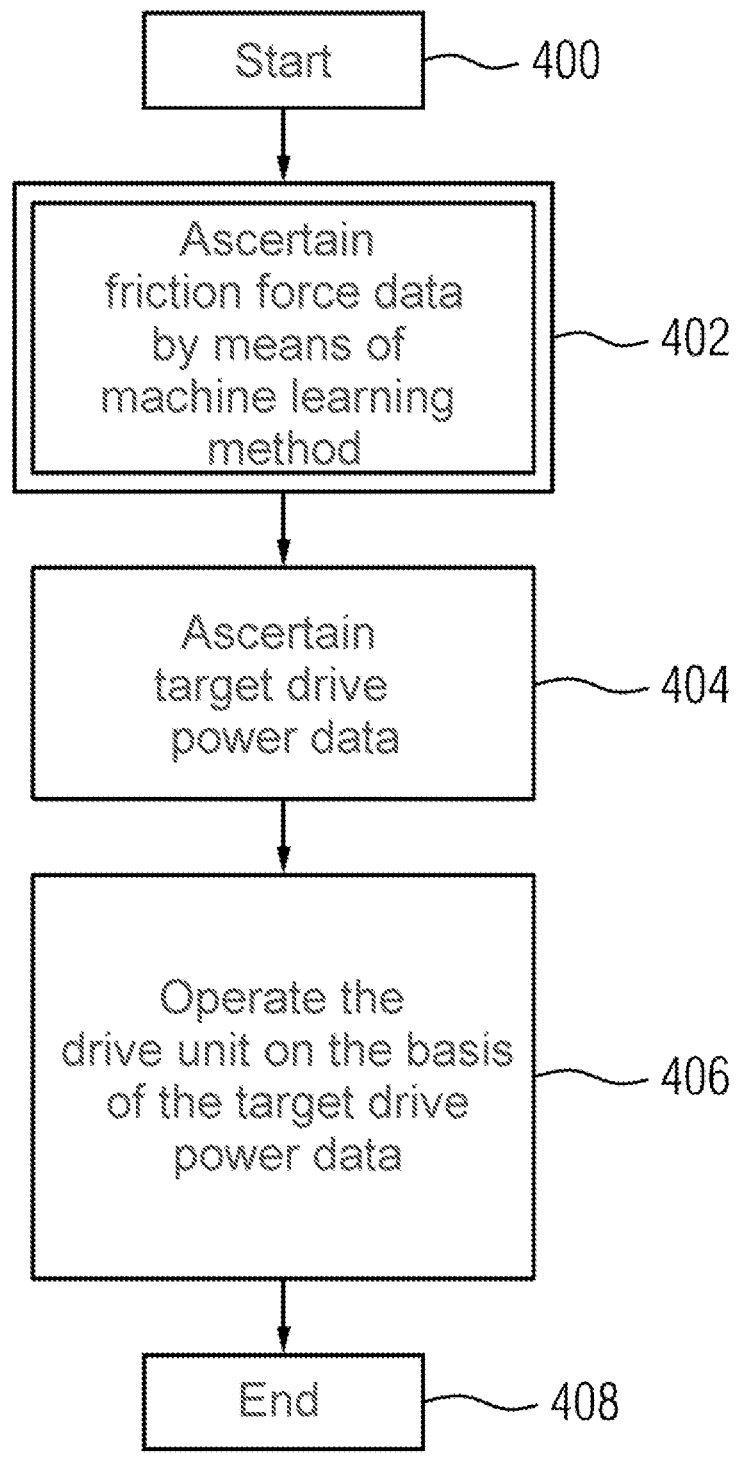

Further features and objects of the present invention will become apparent to a person skilled in the art by practicing the present teaching and taking into consideration the accompanying drawings. In the figures:

FIG. 1 shows a schematic view of an embodiment of a closing device according to the invention, a server apparatus according to the invention, and a communication terminal according to the invention, FIG. 2 shows a sketch of the principle for illustrating the method according to the invention, FIG. 3 shows a schematic view of closing-position-dependent motor current data for further illustration of the method according to the invention, and FIG. 4 shows a schematic view of a flow chart that shows one embodiment of the method according to the invention.

Elements of identical design or function are provided with the same reference designations across all figures.

Reference is first to be made to FIG. 1 which shows a vehicle 10 with a closing device 12. The closing device 12 comprises a closing part 14 which, in the concrete example of FIG. 1, is illustrated as a window or windowpane of the vehicle 10. In other embodiments, the closing part 14 can be a sunroof, a door or a flap such as, for example, a tailgate of the vehicle 10. The closing part 14 can move between an open position and a closed position in such a way that an opening 16 associated with the closing part 14 can be opened or closed by means of the closing part 14.

The closing device 12 further comprises an electric motor drive unit 18 for driving the closing part 14. The electric motor drive unit 18 can, for example, comprise an electric motor whose drive power results in movement of the closing part 14 between the open position and the closed position. The closing device 12 further comprises a control device 20 that is operationally connected to the electric motor drive unit 18 or the electric motor, and controls the operation of the drive unit 18 or the electric motor.

A server apparatus 22 and a communication terminal 24 are also illustrated in FIG. 1. The server apparatus 22 here is designed external to the vehicle 10, i.e. the server apparatus 22 is designed outside the vehicle 10. The communication terminal 24 is also designed external to the vehicle 10 and is, moreover, of mobile design, so that, for example, a person 26 can carry the communication terminal 24 with them.

The control device 20, the server apparatus 22 and the communication terminal 24 are designed to carry out a method for carrying out a closing operation of the closing part 14 as explained in connection with FIGS. 2 to 4.

Reference is now to be made to FIG. 2, which shows a sketch of the principle to illustrate the method according to the invention for carrying out a closing operation of the closing part 14.

The control device 20 and the server apparatus 22 are again shown in FIG. 2. The control device 20 is, for example, installed in the vehicle 10, and is connected to sensor devices 28 that provide data 30 to the control device 20 that represent, for example, the ambient temperature or the ambient air humidity of the vehicle 10, the position of the closing part 14 or the current movement speed of the closing part 14. The control device 20 additionally receives further specific data 30 relating to the electric motor of the drive unit 18 such as, for example, the motor current or the motor voltage of the electric motor. The control device 20 can, for example, ascertain a current load torque at the electric motor of the drive unit 18 from motor current and motor voltage data. Since the control device 20 always also acquires the current position of the closing part 14, the current load torque of the electric motor can be ascertained depending on the respective position or closing position of the closing part 14.

Estimated values for friction force data that represent a current stiffness of the closing device 12 can now be ascertained on the basis of these data 30 by means of a model 32 which is described in more detail in connection with the server apparatus 22. These friction force data largely represent the friction force to be expected at the respective closing position of the closing part 14 which opposes the closing part 14 in its movement from the open position into the closed position. In other words, the expected resistance when closing the closing part 14 is estimated using the estimated friction force data. These estimated values are relevant in particular during the start-up or transient phase of the closing device 12, since in this phase (the first 1-3 cm of the movement distance) of the movement of the closing part 14, the mechanical components of the closing device 12 need to be started up and/or pretensioned and/or, for example, play in the cable pulls or Bowden cables must be compensated for. The starting up or transient settling of the components of the closing device 12 leads to a closing-position-dependent friction force or stiffness which opposes the closing part 14 in its movement from the open position into the closed position. This stiffness is estimated with the aid of the model 32 in the form of friction force data, without carrying out additional current measurements on the drive unit 18 or at the electric motor.

As has already been explained, the estimated friction force data are ascertained by means of a model 32. The model 32 is based here on a machine learning method 34 that is carried out on the server apparatus 22. The machine learning method 34 here uses, inter alia, the data 30 that are transmitted from the sensor devices 28 to the server apparatus 22, and used there as input data 36 for training the machine learning method 34. These input data 36 thus not only comprise data that, for example, indicate the position of the closing part 14 or the movement speed of the closing part 14, but also data that represent the ambient temperature or the ambient air humidity of the vehicle 10.

The machine learning method 34 is trained with the aid of the input data 36 in order finally to generate the model 32 that supplies the friction force data that represent the stiffness of the closing device to be expected for the respective closing position of the closing part 14.

The input data 36 are, for example, generated during test, training or validation runs of the vehicle 10 and are the final result of closing operations of the closing part 14 that have already occurred, i.e. been completed in the past or already carried out. The input data 36 can thus be thought of as if, for example, in the course of very different test, training or validation runs under very different ambient conditions (i.e. with different ambient temperatures and/or different ambient air humidities), the closing part 14 of the vehicle 10 was moved a sufficiently large number of times, and that closing-position-dependent load torque measurements were carried out at the electric motor of the drive unit 18 during the movement of the closing part 14. These closing-position-dependent load torques were then converted into friction force data actually arising in the respective environment of the vehicle 10, and stored as reference friction force data for training the machine learning method 34. On the basis of these reference friction force data the machine learning method 34 can then provide closing-position-dependent estimated values for the friction forces currently to be expected in the closing device 12 for the respective ambient conditions of the vehicle 10, without the necessity for the actual values of the friction force occurring at the respective closing position having to be measured when a new closing operation of the closing part 14 occurs.

The machine learning method 34 thus enables a computerized or theoretical estimate of the actually occurring friction force data for the respective closing position of the closing part 14. This computerized or theoretical estimate is based on the data actually ascertained in advance that were ascertained as input data 36 for training the machine learning method 34. With the aid of the machine learning method 34 it is thus no longer necessary to determine the actual stiffness of the closing device 12 or the friction force data actually arising for a current closing operation of the closing part 14. Instead, the friction force data actually occurring are estimated by means of the machine learning method 34 and of the model 32 ascertained therefrom. As has already been mentioned a number of times, this estimate is particularly advantageous during the transient phase of the closing device 12, since measurement data that represent the stiffness of the closing device 12 can only be obtained with great difficulty here, if at all.

As can further be seen in FIG. 2, in addition to the input data 36 for training the machine learning method 34, the friction force data 38 representing a current stiffness are also taken into consideration as additional input data for training the machine learning method 34. In other words, the friction force data ascertained additionally and/or estimated are taken into consideration as additional input data for training the machine learning method 34. This has the advantage that the system can update itself, and also that aging effects that occur in the closing device 12 to which, for example, mechanical wear of the guides, increasing cable play, aging effects in the springs etc. can contribute, can be taken into consideration.

The updating of the machine learning method 34 does not, however, have to occur with every new closing operation of the closing part 14. The updating can rather be dependent on what are known as trigger events. These trigger events can be divided into internal and external trigger events.

An internal trigger event is, for example, a system diagnosis or self-diagnosis 40 carried out by the control device 20 of the vehicle 10. A current closing-position-dependent load torque (ascertained for example by a load torque measurement at the electric motor) is here compared with the load torque estimated by the machine learning method for the same closing position. If the current load torque differs from the load torque estimated by means of the machine learning method by more than a threshold value, then an internal trigger signal can be output in the context of the system diagnosis or self-diagnosis 40, making the need for an update of the model 32, and thereby the necessity of a renewed training of the machine learning method 34, necessary.

An external trigger event is, for example, an external trigger signal 42 output from a control center or an external monitoring device which identifies the need for an update of the model 32 or the need for renewed training of the machine learning method 34. The external trigger signal 42 can, for example, be output by the control center when external effects (such as the updating of the control software, changes to the closing device etc.) make an update to the model 32 necessary.

With the aid of the internal and external trigger events, updating the machine learning method 34, and thereby an update to the model 32, can be initiated deliberately, i.e. only when required. It is particularly helpful to use the friction force data 38 as additional input data for training the machine learning method 34 in particular for the case in which an update to the machine learning method 34 is needed. This is because in this case the friction force data that have already been ascertained, or the historical friction force data, are also taken into consideration for updating and further developing the machine learning method 34.

Reference is now to be made to FIG. 3, which shows a schematic view of motor current values (y-axis) against the closing position (x-axis) of the closing part 14. The closing position is indicated here in FIG. 3 such that a movement of the closing part 14 from the left (in the region of 400 mm) to the right (in the direction toward a position of 0 mm) closes the opening 16 of the vehicle 10. In other words, the closing part 14 is located in its open position on the left-hand side of the graph of FIG. 3, and is in its closed position on the right-hand side.

As can also be seen in FIG. 3, two curves are shown. A first curve 44, which is shown as a dash-dotted line, is a curve of motor current values as is known to the expert from the prior art. The first curve 44 represents the result of a closing-position-dependent load torque measurement at the electric motor of the drive unit 18. If the closing part 14 is in its open position, i.e. in a region at a position of about 400 mm or more, then in the concrete example, for example a motor current of just under 5 A results. On the way toward the closed position, i.e. in a region at a position of about 0 mm, the motor current rises continuously. When the closing part 14 reaches the seal at the opening 16, there is a sudden rise in the motor current (illustrated by the arrow 48) as a result of the increased resistance. The motor current rises further (see arrow 50) until the closing part 14 has finally reached the closed position. Such a curve is commonly known to the expert from the prior art.

In addition to the curve 44, however, FIG. 3 shows a second curve 46 that is shifted with respect to the curve 44. As can be seen, the second curve 46 is shifted upwards in comparison with the first curve 44, i.e. towards higher motor current values. As can also be seen, the distance (arrow 52) between the curves 44 and 46 is smaller in the region of the open position than the distance (arrow 54) between the curves 44 and 46 in the region of the closed position. A local increase in the motor current at a position in the region of about 300 mm (arrow 56) is also present.

The curve 46 represents target drive power data of the drive unit 18, i.e. the drive power data with which the electric motor of the drive unit 18 is to be operated, or that which arise during corresponding operation of the electric motor, wherein the target drive power data are selected such that the closing part 14 can overcome the friction force data ascertained by means of the machine learning method 34 at the respective closing position. In other words, if, for example, the machine learning method 34 predicts a somewhat increased stiffness of the closing device 12 in the region of the open position, then this increased stiffness is converted into a target drive power that takes the increased stiffness into consideration. The consequence is that the closing part 14 is no longer operated with target drive power data according to curve 44, but with target drive power data according to curve 46. In the region of the open position the target drive power will thus be somewhat increased (arrow 52) so that the closing part 14 can be moved without difficulty in the direction of the closed position even in the presence of locally increased resistance. If the machine learning method 34 predicts, for example, a continuous increase in the local stiffness from the open position to the closed position of the closing part 14, this will result in continuously greater target drive power data. This is illustrated, by way of example, in that the distance in the region of the closed position (arrow 54) is greater than in the region of the open position (arrow 52).

The machine learning method can, however, also predict a locally limited increase in the stiffness (arrow 56). This locally limited increase can, for example, arise as a result of soiling in the guide, of corrosion, and so forth. If the machine learning method predicts a locally increased stiffness for this region, then the target drive power (arrow 56) for this region is correspondingly increased further.

The consequence of adjusting the target drive power from curve 44 to curve 46 is that in the presence of aging effects occurring in the course of using the closing device 12, locally occurring stiffnesses and/or changes to the stiffness arising from external influences (changes to the ambient temperature and/or ambient air humidity), the drive unit 18 or its electric motor is always operated with the correspondingly adjusted target drive power. As a result, an increase in the stiffness is not immediately recognized as a trapping event or reversing event, since the increase in the stiffness is not the result of an object being trapped, but is the result of a behavior inherent to the closing device (ambient temperature, ambient air humidity, aging effects, corrosion, soiling and so forth). It is, instead, ensured that a sufficiently large target drive power is always specified even in the presence of changes to the stiffness that are inherent to the closing device. The result of this is that changes in the stiffness are not classified straight away as a trapping event, and the number of false positive trapping events, i.e. the number of those trapping events that have been mistakenly classified as trapping events, although in fact only a case of a local increase in the stiffness was present, is reduced.

Reference is now finally to be made to FIG. 4, which shows a schematic view of a flow chart for an embodiment of the method according to the invention.

The method starts with step 400.

In the subsequent step 402, friction force data are ascertained by means of the machine learning method 34. The machine learning method 34 is trained here on the basis of reference friction force data that result, as input data 36, from past closing operations of the closing part 14. The data 30 provided by the sensor device 28 are used as the input data 36. This also includes data ascertained from closing-position-dependent load torque measurements that have been made at the electric motor of the drive unit 18 during the test, training and validation runs. Since these runs have been undertaken at different ambient temperatures and ambient air humidities, and the data 30 also take the respectively present ambient temperature or ambient air humidity into consideration, the input data 36 also contain data sets related to different ambient temperatures and ambient air humidities with which the machine learning method 34 is trained. As a result it is possible to ascertain reliable friction force data, which represent the stiffness to be expected, for the respective ambient circumstances of the vehicle 10.

Target drive power data that take into consideration the friction force data ascertained in step 402 are ascertained in the next step 404. Taking the friction force data into consideration is done in that the target drive power data are selected in such a way that the closing part 14, as it moves from the open position into the closed position, can at least overcome the friction force that is estimated by the friction force data to be acting against it at the respective closing position.

Finally, in a step 406, the drive unit 18, or the electric motor of the drive unit 18, is operated on the basis of the target drive power data ascertained in step 404 in order to perform the closing operation of the closing part 14 in at least one subsequent closing operation. When the drive unit 18 is operating, a curve 46 then, for example, develops, as shown in FIG. 3, so that the closing part 14 can be moved securely and reliably from the open position into the closed position even in the case of locally increased stiffness without determining a false positive trapping event (in the region, for example, of 300 mm-arrow 56).

The method finally ends at step 408.

As was already explained at the beginning, the method described in connection with FIGS. 2 to 4 can either be carried out directly on the control device 20 or on the server apparatus 22, or on the mobile communication terminal 24. The method is preferably not carried out on the control device 20, in order to save computing capacity, installation space and costs in the control device 20.

The invention claimed is:

1. A method for carrying out a closing operation of a closing part of a closing device of a vehicle driven by an electric motor drive unit, wherein the method comprises the following steps:
ascertaining friction force data representing a current stiffness of the closing device in a control unit using a model,
ascertaining target drive power data for the drive unit that take the friction force data into consideration, and operating the drive unit based on the ascertained target drive power data to perform the closing operation during at least one subsequent closing operation, wherein the model was generated by a machine learning method on an external server device, wherein the machine learning method is trained with frictional force reference data as input data from previous closure operations, wherein the input data is transmitted from the control unit to the external server device to update the model, and where the model is updated based on current input data in response to a trigger event in the external server device and transferred to the control unit in an updated form.

2. The method as claimed in claim 1, wherein the reference friction force data are ascertained based on closing-position-dependent load torque measurements at an electric motor of the drive unit.

3. The method as claimed in claim 1, wherein the input data also furthermore comprise data that represent at least one of an ambient temperature of the vehicle, an ambient air humidity of the vehicle and a positioning speed of the closing part.

4. The method as claimed in claim 1, wherein the friction force data representing a current stiffness are used as additional input data for training the machine learning method.

5. A closing device for a vehicle, with:
a closing part for closing an opening of the vehicle,
an electric motor drive unit for driving the closing part and
a control device that is configured for carrying out a method as claimed in claim 1.

6. A communication terminal that is configured to carry out the machine learning method as claimed in claim 1, wherein the communication terminal is external to the vehicle and is mobile in design.

7. The communication terminal as claimed in claim 6, wherein the reference friction force data are ascertained based on closing-position-dependent load torque measurements at an electric motor of the drive unit.

8. The communication terminal as claimed in claim 7, wherein the input data also furthermore comprise data that represent at least one of an ambient temperature of the vehicle, an ambient air humidity of the vehicle and a positioning speed of the closing part.

9. The communication terminal as claimed in claim 8, wherein the friction force data representing a current stiffness are used as additional input data for training the machine learning method.

10. The communication terminal as claimed in claim 7, wherein the friction force data representing a current stiffness are used as additional input data for training the machine learning method.

11. The communication terminal as claimed in claim 6, wherein the input data also furthermore comprise data that represent at least one of an ambient temperature of the vehicle, an ambient air humidity of the vehicle and a positioning speed of the closing part.

12. The communication terminal as claimed in claim 11, wherein the friction force data representing a current stiffness are used as additional input data for training the machine learning method.

13. The communication terminal as claimed in claim 6, wherein the friction force data representing a current stiffness are used as additional input data for training the machine learning method.

14. The method as claimed in claim 3, wherein the friction force data representing a current stiffness are used as additional input data for training the machine learning method.

15. The method as claimed in claim 2, wherein the input data also furthermore comprise data that represent at least one of an ambient temperature of the vehicle, an ambient air humidity of the vehicle and a positioning speed of the closing part.

16. The method as claimed in claim 2, wherein the friction force data representing a current stiffness are used as additional input data for training the machine learning method.

* * * * *